United States Patent

Swisher, Jr. et al.

[15] 3,637,036
[45] Jan. 25, 1972

[54] HYDROSTATIC DRIVE SYSTEM

[72] Inventors: George W. Swisher, Jr., Oklahoma City; Don W. Smith, Edmond; Ralph K. Snow, Jr., Oklahoma City, all of Okla.

[73] Assignee: CMI Corporation, Oklahoma City, Okla.

[22] Filed: June 15, 1970

[21] Appl. No.: 46,129

[52] U.S. Cl. ............................................. 180/66 R, 60/53 R
[51] Int. Cl. ................................................................ B60k 17/10
[58] Field of Search ........................... 180/66; 60/53 R, 53 A

[56] References Cited

UNITED STATES PATENTS

| | | | |
|---|---|---|---|
| 1,238,927 | 9/1917 | Manly | 60/53 |
| 2,161,439 | 6/1939 | Thoma | 60/53 |
| 2,516,662 | 7/1950 | Vickers et al. | 180/66 |
| 2,541,292 | 2/1951 | Robinson | 60/53 |
| 3,161,246 | 12/1964 | Meeker et al. | 180/66 X |
| 3,203,185 | 8/1965 | Williams | 60/53 A X |
| 3,238,724 | 3/1966 | Miller | 60/53 A |
| 3,303,901 | 2/1967 | Schou | 180/66 X |
| 3,568,778 | 3/1971 | Swisher, Jr. et al. | 180/66 X |

FOREIGN PATENTS OR APPLICATIONS

| | | | |
|---|---|---|---|
| 961,060 | 6/1964 | Great Britain | 60/53 |

*Primary Examiner*—Leo Friaglia
*Assistant Examiner*—Milton L. Smith
*Attorney*—Dunlap, Laney, Hessin & Dougherty

[57] ABSTRACT

A drive system for a vehicle, particularly suited for use with highway construction equipment. The system employs a constant speed engine driving a variable displacement pump, and the pump, in turn, drives a variable displacement motor and a fixed displacement motor connected in parallel to the pump. The motors are connected in parallel to the drive wheel means of the vehicle. Controls are provided to operate the pump between zero and maximum displacement while the variable displacement motor is at maximum displacement, and to vary the displacement of the motor while the pump is at maximum displacement, such that the drive wheels of the vehicle are provided a maximum torque in the lower speed range where the hardest work is done by the vehicle, yet provide for higher speeds at reduced torque for traveling from one location to another. A dual drive system is also disclosed.

21 Claims, 16 Drawing Figures

INVENTORS
GEORGE W. SWISHER JR.,
DON W. SMITH &
RALPH K. SNOW JR.

BY Dunlap, Laney, Hessin & Dougherty
ATTORNEYS

HYDROSTATIC DRIVE SYSTEM

BACKGROUND OF THE INVENTION

1. Field of the Invention

This invention relates generally to an improved hydrostatic drive system for vehicles, and more particularly, but not by way of limitation, to an improved drive system for highway construction equipment.

2. Description of the Prior Art

Probably the most popular hydrostatic drive system for equipment, such as highway construction equipment, requiring a high torque output in the lower speed range comprises a variable displacement pump driven by a constant speed engine and, in turn, driving a fixed displacement motor, with the pump and the motor having equal displacements. This type of system is desirable in providing high output torque at low speeds, but the system is unable to provide a reasonably fast speed for moving the equipment from one working location to another.

SUMMARY OF THE INVENTION

An object of the invention is to provide a hydrostatic drive system for mobile equipment which provides a high output torque through the working speeds of the equipment and yet provides a traveling speed for the efficient movement of the equipment from one working location to another.

Another object of the invention is to provide a hydrostatic drive system for mobile equipment which utilizes standard pumps and motors.

A further object of the invention is to provide a hydrostatic drive system employing a variable displacement pump and a variable displacement motor wherein the displacements of the pump and motor are varied separately and automatically in the sequence providing the most efficient operation.

Another object of the invention is to provide a control system for variable displacement pumps and variable displacement motors employed in the system where the control system is actuated by a single foot pedal.

Another object of the invention is to provide a control system for a hydrostatic drive system having a variable displacement pump and a variable displacement motor wherein the pump may be operated in either forward or reverse and the motor may be operated only when the pump is at maximum displacement by employing a single foot pedal.

Other objects and advantages of the invention will be evident from the following detailed description when read in conjunction with the accompanying drawings illustrating various embodiments of the invention.

DESCRIPTION OF THE PREFERRED EMBODIMENTS

Figure 1:
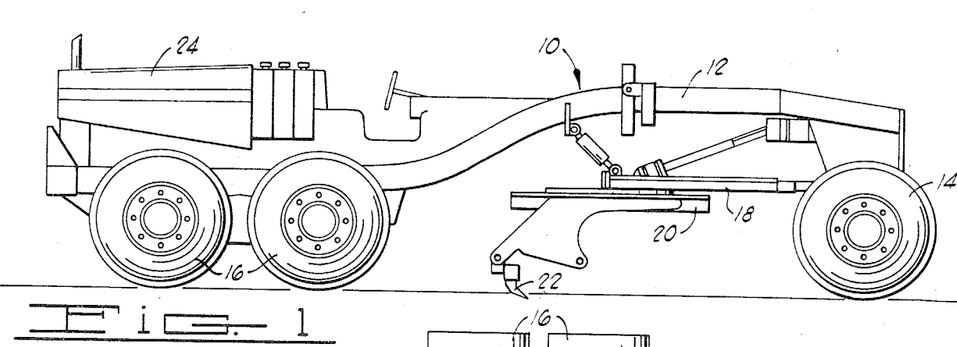
FIG. 1 is a side elevational view of a motor grader employing the present drive system.

Referring to the drawings in detail, and particularly FIG. 1, reference character 10 generally designates a motor grader on which the present drive system may be typically employed. The motor grader 10 has the usual main frame 12 mounted on freewheeling front steering wheels 14 and tandem type rear drive wheels 16. The motor grader also includes the usual drawbar 18 and circle 20 which carries the working tool, such as a scarifier 22 as shown in FIG. 1, or any other desired working tool, such as a blade. The engine 24 for the motor grader is mounted on the rear of the main frame 12 essentially above the rear drive wheels 16 and, when the present drive system is used, the engine will be of the type typically employed in a hydrostatic drive system and will operate at a constant speed during working of the motor grader.

Figure 2A:
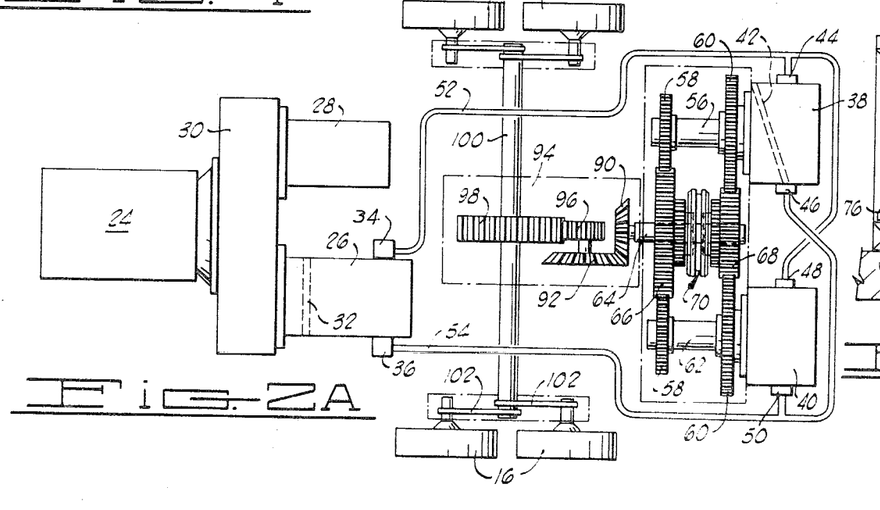
FIG. 2A is a schematic diagram of the drive system of this invention as applied to the motor grader of FIG. 1.

In accordance with the present invention, and as shown in FIG. 2A, the engine 24 drives a main hydrostatic pump 26 and an auxiliary pump 28 through a suitable gearbox 30. The auxiliary pump 28 is employed to produce the necessary hydraulic pressure for the operation of auxiliary services, such as steering and controlling the grade and slope of the working tool 22 of the motor grader 10. The main pump 26 is a variable displacement pump having a control element 32 by means of which the displacement of the pump 26 may be varied from zero to the maximum displacement of the pump. A typical main pump which may be employed is a variable displacement, axial piston pump available from Sunstrand Hydro-Transmission of LaSalle, Illinois. In this latter type of pump, the control element 32 is in the form of a swashplate which, when tilted, varies the displacement of the pump. The control element 32 of the pump 26 is schematically illustrated in FIG. 2A as being in a zero or neutral position, such that the pump 26 will have a zero displacement, which is the position of the control element when the drive system is first activated. It will also be observed in the drawing that the pump 26 has what is called herein a forward port 34 and a reverse port 36.

The present drive system in the form illustrated in FIG. 2A also includes a variable displacement hydrostatic motor 38 and a fixed displacement hydrostatic motor 40. The variable displacement motor 38 has a control element 42 therein by means of which the displacement of the motor may be varied from zero to maximum. The motor 38 may typically be a Sunstrand variable displacement, axial piston motor obtainable from the company mentioned earlier. In the Sunstrand-type of motor, the control element 42 is in the form of a swashplate which, when tilted, varies the displacement of the motor. The motor 38 has what is called herein a forward port 44 and a reverse port 46, while the motor 40 has a forward port 48 and a reverse port 50. The forward port 34 of the pump 26 is connected by a suitable conduit 52 to the forward ports of the motors 38 and 40, in parallel, and the reverse port 36 of the pump 26 is connected by a conduit 54 to the reverse ports of the motors 38 and 40, in parallel.

The output shaft 56 of the variable displacement motor 38 has a pair of ring gears 58 and 60 mounted thereon in spaced relation along the length of the shaft, such that both of the gears 58 and 60 turn upon operation of the motor 38. It will be observed in the drawing that the outermost gear 58, with respect to the motor 38, is of a smaller diameter than the gear 60, for purposes to be described. Identical gears 58 and 60 are mounted on the output shaft 62 of the fixed displacement motor 40 in alignment with the corresponding gears 58 and 60 associated with the motor 38.

A shaft 64 employed in driving the wheels 16, as will be hereafter explained, has a pair of ring gears 66 and 68 arranged to be selectively connected thereto by a suitable clutch 70. The gear 66 is positioned and sized to mesh with the gears 58 of the drive motors, and the gear 68 is positioned and sized to mesh with the gears 60 of the motors. It will also be observed that the gear 66 is larger in diameter than the gear 68. Thus, when the clutch 70 is positioned to connect the gear 66 to the shaft 64, the shaft 64 will be turned at a lesser speed than when the clutch 70 is positioned to connect the gear 68 to the shaft 64, providing the motors 38 and 40 are being operated at the same speed.

Figure 2B:
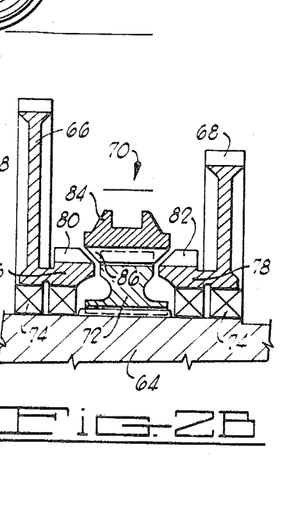
FIG. 2B is a partial enlarged illustration of the clutch used in the drive system of FIG. 2A.

The clutch 70 may be of any desired construction which will selectively and independently connect the gears 66 and 68 to the shaft 64. In a preferred embodiment, the clutch 70, as partially illustrated in FIG. 2B, comprises a ring 72 rigidly secured on the shaft 64 between the gears 66 and 68. The gears 66 and 68 are journaled on the shaft 64 by suitable bearings 74. A hub 76 projects from the end of the gear 66 facing the rig 72, and a similar hub 78 projects from the end of the gear 68 facing the ring 72. Gear teeth 80 are formed around the hub 76 and gear teeth 82 are formed around the hub 78. A control ring 84 is splined onto the outer periphery of the ring 72 in such a manner that the control ring 84 will rotate with the ring 72 and the shaft 64, but the control ring 84 may be moved toward either the ring gear 66 or the ring gear 68. Gear teeth 86 formed around the inner periphery of the control ring 84 are sized to mesh with the gear teeth 80 or 82. Thus, when the control ring 84 is moved to the left from the position shown in FIG. 2B, the gear teeth on the control ring will mesh with the gear teeth 80 and provide a driving connection from the ring gear 66 to the shaft 64. On the other hand, when the control ring 84 is moved to the right from the position shown in FIG. 2B, the gear teeth 86 on the control ring will mesh with the gear teeth 82 and provide a driving connection from the ring gear 68 to the shaft 64. When the control ring 84 is in the neutral position as shown in FIG. 2B, neither of the gears 66 nor 68 will be drivingly connected to the shaft 64. The control ring 84 may be moved lengthwise by any desired mechanism which will be under the control of the driver of the motor grader 12.

One end of the shaft 64 (FIG. 2A) has a bevel gear 90 mounted thereon in a position to engage a mating bevel gear 92 constituting a portion of a gearbox 94. The bevel gear 92 drives a pinion 96 which in turn engages a ring gear 98 mounted on a drive shaft 100 for turning all of the drive wheels 16 in the same direction at the same speed. Each end of the drive shaft 100 is connected to the respective pair of wheels 16 by any suitable means, such as chains 102, to transmit the torque applied to the shaft 100 to the drive wheels.

Figure 3:
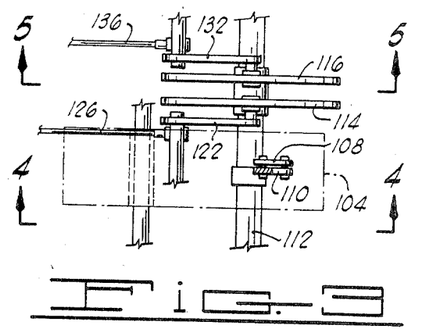
FIG. 3 is a schematic plan view of a foot pedal and cam arrangement for controlling the drive system, with the foot pedal being shown in dashed lines for clarity of illustration.
Figures 4, 5:
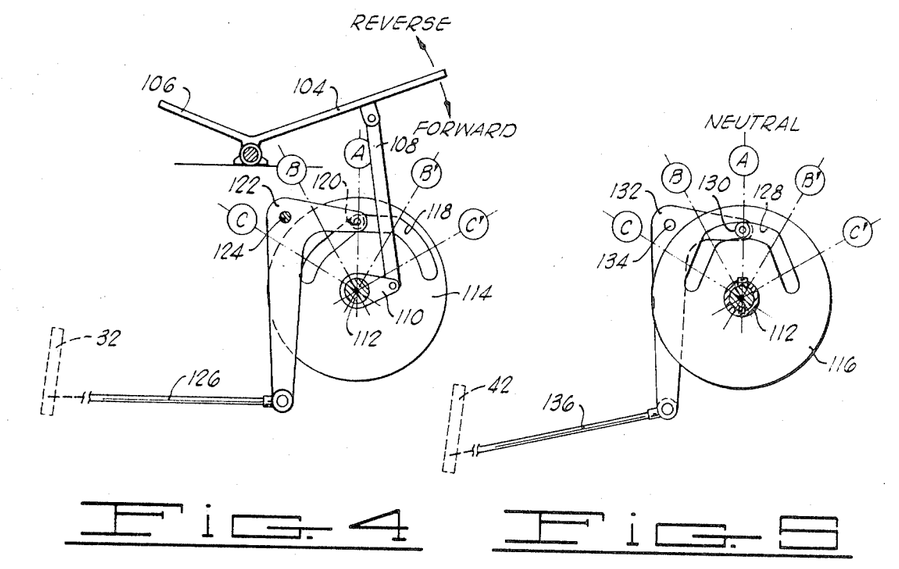
FIG. 4 is a sectional view as taken along lines 4—4 of FIG. 3.
FIG. 5 is a sectional view as taken along lines 5—5 of FIG. 3.

The control system for positioning the control element 32 of the main pump 26 and the control element 42 of the variable displacement motor 38 is illustrated in FIGS. 3, 4 and 5. This control system comprises a foot pedal 104 (FIG. 4) suitably pivotally supported on the main frame of the motor grader 10 in a position accessible to the operator of the motor grader. The foot pedal 104 preferably has a heel portion 106 to facilitate the pivoting of the foot pedal for both forward and reverse movements of the motor grader, as will be described. A link 108 is pinned to the foot pedal 104 and a crank 110 rigidly secured on a shaft 112. The shaft 112 is suitably journaled (not shown) to the main frame 12 of the motor grader. A pair of cams 114 and 116 (FIGS. 4 and 5) are rigidly secured, such as by being keyed, on the shaft 112 in spaced relation, such that the cams will be turned upon movement of the foot pedal.

The cam 114 is associated with the main pump 26 and has a slot 118 formed therein of varying radii from the centerline of the shaft 112 to form cam surfaces. A follower 120 rides in the slot 118 and is mounted on one end of a bellcrank 122. The bellcrank 122 is pivotally secured by pin 124 to the main frame of the motor grader, and the opposite end of the bellcrank is suitably connected to a control rod 126. The control rod 126 is in turn suitably connected to the control element 32 of the main pump 26, as indicated by the dashed line in FIG. 4. It will thus be seen that when the cam 114 is turned by movement of the foot pedal 104, the follower 120 will be engaged by the sides of the slot 118 when the radius of the slot varies in order that the follower will be moved upwardly and downwardly from the position shown in FIG. 4, and when the follower 120 is so moved, the bellcrank 122 will be pivoted to move the control rod 126 either to the left or to the right from the position shown in FIG. 4 to control the position of the control element 32.

The cam 116 associated with the variable displacement motor 38, has a slot 128 formed therethrough, and the slot 128 has a varying radius with respect to the centerline of the shaft 112 and, thus, the centerline of the respective cam. A cam follower 130 rides in the slot 128 and is connected to one end of another bellcrank 132. The bellcrank 132 is pivotally secured to the main frame 12 of the motor grader 10 by a pin 134, and the opposite end of the bellcrank 132 is suitably connected to one end of another control rod 136. The opposite end of the control rod 136 is suitably connected to the control element 42 of the variable displacement pump 38 as indicated by the dashed line in FIG. 5. It will thus also be seen that the follower 130 will be moved up and down from the position shown in FIG. 5 turning of the cam 116 to move the control rod 136 to the left or to the right from the position shown in FIG. 5 and thus control the position of the control element 42.

The cams 114 and 116, being keyed to the common shaft 112, will turn in the same direction through the same angle upon either raising or lowering of the foot pedal 104. For purposes of description, the cams 114 and 116 are indicated in FIGS. 4 and 5 as having a neutral position A; forward positions B and C, and reverse positions B' and C'. With the cams in neutral positions, the control element 32 of the main pump 26 associated with cam 114 will be in a zero displacement position, and the control element 42 of the variable displacement motor 38 associated with the cam 116 will be in a maximum displacement position. In such neutral positions, the main pump 26 supplies no oil to the motors 38 and 40, so the wheels 16 will not be driven.

As the foot pedal 104 is depressed in the forward direction as indicated in FIG. 4, the follower 120 will be moved, relatively speaking, from position A to position B in the slot 118 of the cam 114. The configuration of the slot 118 between these two positions is such that the follower 120 will be lowered from the position shown in FIG. 4 to pivot the bellcrank 122 and thus shift the control element 32 of the main pump 26 from the zero displacement position to the maximum displacement position. At this same time, the follower 130 will be moved, relatively speaking, through the slot 128 of the cam 116 between the positions A and B. However, the radius of the slot 128 is uniform between the positions A and B, such that the follower 130 will be retained in the neutral position as shown in FIG. 5, and the control element 42 of the variable displacement motor 38 will be held in the maximum displacement position.

Further movement of the foot pedal 104 in the forward direction moves the follower 120 through that portion of the slot 118 between positions B and C. However, the radius of the slot 118 between these two positions is uniform, such that the follower 120 will be retained a fixed distance from the shaft 112 to hold the control element 32 of the pump 26 in its maximum displacement position. At the same time, the follower 120 will be moved through the slot 128 from position B to position C, and this portion of the slot 128 is decreased in radius with respect to the centerline of the shaft 112, such that the follower 130 will be lowered from the position shown in FIG. 5 to pivot the bellcrank 132 and shift the control element 42 of the variable displacement motor 38 from a maximum displacement to a zero displacement position.

As will be clear from an examination of FIGS. 4 and 5, the cams 114 and 116 will be turned in an opposite, counterclockwise direction, when the foot pedal 104 is moved in a reverse direction. The radius of the slot 118 is increased from position A to position B' to thus shift the control element 32 of the main pump 26 in a reverse direction from zero to maximum displacement during the initial portion of the reverse movement of the cams. During this same movement of the cam 116, the slot 128, being of a uniform radius between the position A and position B', will retain the follower 130 in a fixed position and thus hold the control element 42 of the variable displacement motor 38 at maximum displacement. During further reverse movement of the foot pedal 104, the slot 118, being of uniform radius from position B' to position C' will hold the follower 120 in a position to retain the control element 32 in its reverse maximum displacement position. At the same time, the radius of the slot 128 is reduced from position B' to position C' to move the follower 130 downwardly from the position shown in FIG. 5 and move the control element 42 of the variable displacement motor 38 from maximum to zero displacement.

It will also be observed in FIGS. 4 and 5 that the slots 118 and 128 are extended a short distance beyond the positions C and C'. These extensions are of uniform radius and are provided to allow the operator of the foot pedal 104 to slightly overoperate the foot pedal without damage to the linkage systems attached to the foot pedal.

Figure 10:
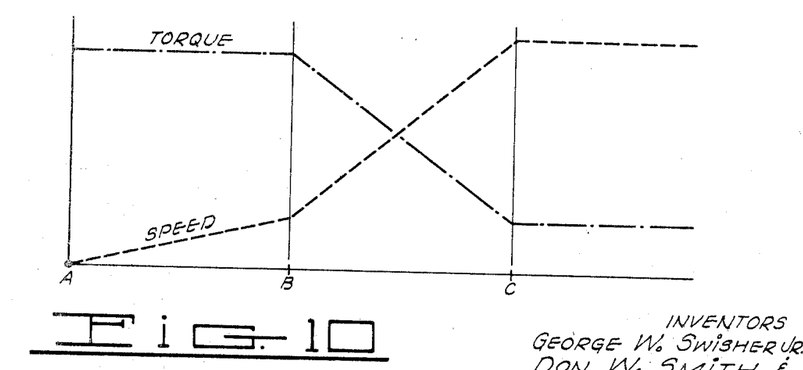
FIG. 10 is a graph illustrating the speed and torque characteristics of a drive system constructed in accordance with this invention.

The effect of the sequential movements of the control elements of the main pump 26 and variable displacement motor 38 is illustrated in the graph of FIG. 10. As the control cams are moved from position A to position B in the manner previously described, the output of the main pump 26 through the forward port 34 is increased to a maximum to drive the motors 38 and 40 in the forward directions at increasing speeds as indicated at position B in FIG. 10. During this same period of time, the motors 38 and 40 will function in a manner similar to fixed displacement motors to provide a constant torque output as indicated in FIG. 10. In this latter connection it should be noted that the torque output of the drive system is retained virtually constant while the displacement of the main pump 26 is increased from zero to maximum, as contrasted with the more conventional drive system utilizing a variable displacement pump and a fixed displacement motor where the torque decreases when the pump approaches maximum displacement. The desirable effect attained with the present system is believed due to the fact that each of the motors 38 and 40 has a maximum displacement equal to the maximum displacement of the pump 26, and this is the preferred embodiment of the invention.

As the control cams are moved from position B to position C in the manner previously described, the amount of hydraulic fluid supplied to the variable displacement motor 38 is gradually decreased to zero with the result that all of the hydraulic fluid is then passed through the fixed displacement motor 40 to drive the motor 40 at a maximum speed at position C. It will thus be seen that the motor 40 will drive the wheels 16 through the various gears illustrated in FIG. 2A and the motor 38 will be, in effect, idling at the same speed. While the speed of the system is being increased from position B to position C, the torque output of the system is correspondingly reduced as indicated in FIG. 10 since the motor 38 is, effectively, taken out of service.

The graph in FIG. 10 illustrates the relative speed and torque output of the drive system irrespective of whether the gear 66 or the gear 68 (FIG. 2A) is connected to the shaft 64. As previously indicated, the gear 68, when connected to the shaft 64, will provide an increase in speed by virtue of the relative sizes of the gears 60 relative to the gears 58. However, such increase in the speed is at a sacrifice of torque as compared with the output of the drive system when the gear 66 is connected to the shaft 64. Therefore, the gear 66 is used when the motor grader is being worked or being moved short distances between working locations, and the gear 68 is used when the motor grader is to be moved relatively longer distances between working locations.

EMBODIMENT OF FIGS. 6-9

Figure 6:
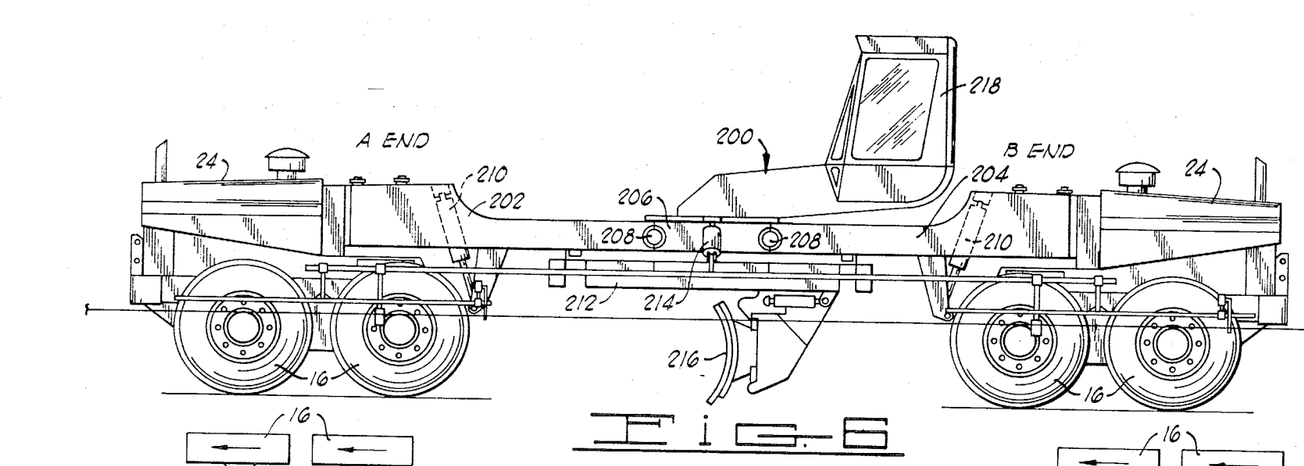
FIG. 6 is a side elevational view of a double ended motor grader apparatus employing the drive system of this invention.

The drive system of this invention is also useful on a vehicle having two sets of drive wheel means, such as on a modified motor grader 200 having a set of drive wheels 16 at one end, called the A end and a separate set of drive wheels 16 at the other end, called the B end thereof. Such a motor grader construction is disclosed in detail in copending application Ser. No. 793,274, filed Jan. 23, 1969, entitled "Improvements in Motor-Grader Apparatus," and assigned to the assignee of the present application. Therefore it is not believed necessary to explain the construction and operation in great detail in this application. Basically, the motor grader 200 comprises a subframe 202 supported on the drive wheels 16 at the A end and a subframe 204 supported on the wheels 16 at the B end, with the subframes 202 and 204 being connected to a centrally located main frame 206 by trunnions 208, such that the height of the main frame 206 may be varied with respect to the drive wheels 16. Each end of the main frame 206 is connected by a hydraulic ram 210 to the respective subframe 202 or 204 for pivoting the subframes 202 and 204 and thus raising or lowering the main frame 206. The usual circle 212 is carried by the main frame 206 by hydraulic cylinders 214, and the working tool 216, such as a blade, is carried by the circle 212. An operator's cab 218 is journaled on the main frame 206 in order that the operator can turn the cab 218 through 180° and be facing in the direction of movement of the motor grader. The circle 212 is normally turned at the same time as the cab 218 in order that the cab and the working tool will be facing in the same direction while the motor grader is being worked. An engine 24 is provided on each of the A and B ends to drive the respective set of drive wheels 16 to provide a motor grader of the maximum utility.

Figure 7:
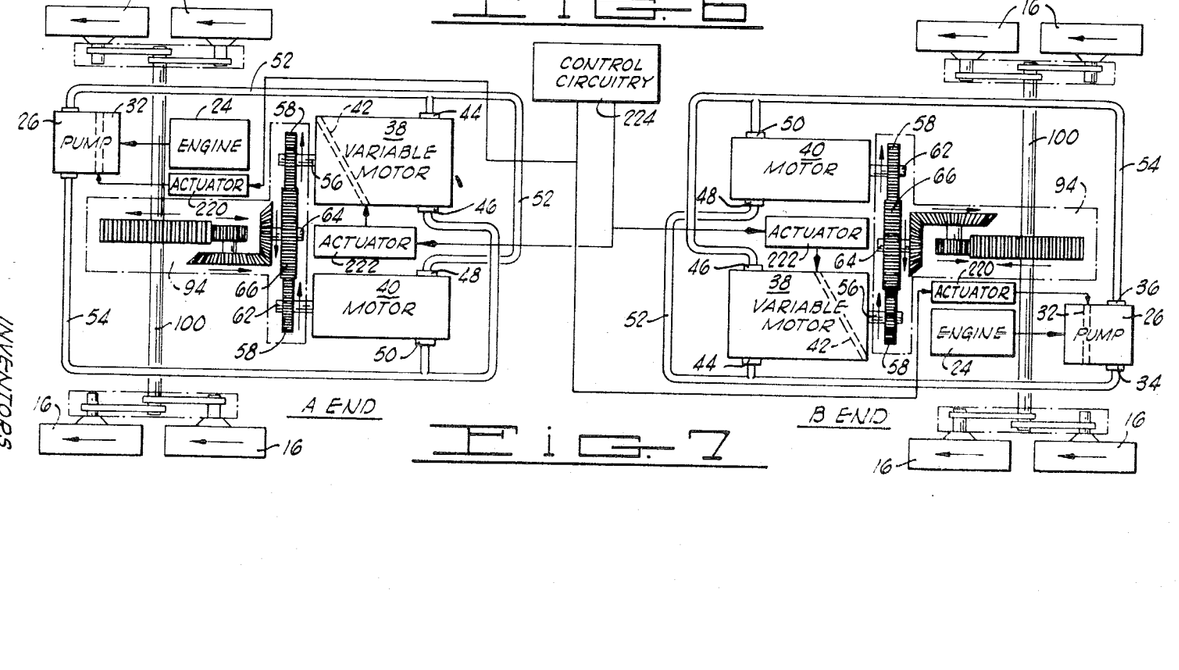
FIG. 7 is a diagrammatic illustration of the drive system for the motor grader shown in FIG. 6.

For a double-ended motor grader 200, an arrangement of main pump 26, variable displacement motor 38 and fixed displacement motor 40 is provided for each set of drive wheels 16 in the same manner as previously described and as illustrated in FIG. 7. This drive system varies from the drive system previously described in providing a single gear 58 on the output shaft of each of the motors 38 and 40 meshing with a single gear 66 secured on the shaft 64 of the gear box 94, rather than using a double set of gears and a clutch as previously described.

Figure 8:
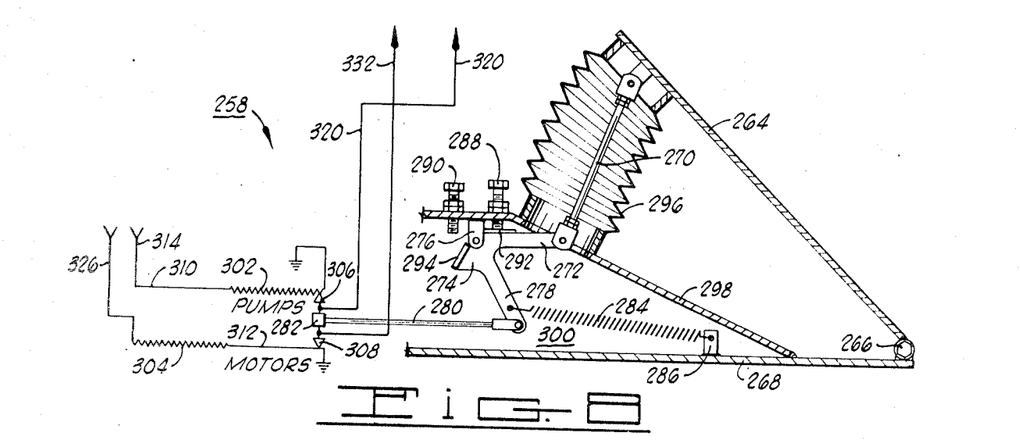
FIG. 8 is a schematic illustration of another foot pedal arrangement.

The dual drive systems illustrated in FIG. 7 are also modified from that previously described in the control system employed for positioning the control elements of the main pumps 26 and the variable motors 38. The control element 32 of each pump 26 is suitably connected to an electrical actuator 220; the control element 42 of each variable motor 38 is suitably connected to an electrical actuator 222, and the actuators 220 and 222 are controlled by a control circuit 224 by means of which the pumps 26 and motors 38 are operated in the same sequence as previously described. The actuators 220 and 222 and the control circuit 224 are schematically illustrated in FIGS. 8 and 9 and described in detail below.

Figure 9:
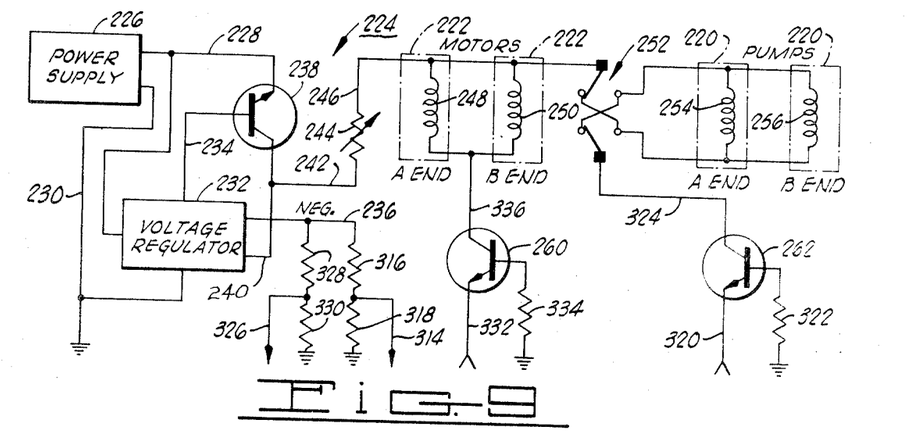
FIG. 9 is a schematic diagram of control circuitry utilized with the foot pedal shown in FIG. 8 and the drive system shown in FIG. 7.

Referring now to FIG. 9, control circuitry 224 includes a power supply 226 providing a positive output via lead 228 and system ground connection onto lead 230. The power supply 226 may be such as a 24-volt DC supply as is conventionally employed on such similar types of heavy equipment. A voltage regulator 232 provides a regulated positive DC on line 234, while a regulated negative DC voltage is available on a lead 236.

The positive DC voltage on lead 234 is applied to the base of an NPN-transistor 238 having its emitter connected to positive lead 228 from power supply 226 and its collector connected to a return lead 240 from voltage regulator 232.

Transistor 238 provides fine regulation of a selected intermediate positive DC voltage on lead 242 for potential adjustment via a potentiometer 244 connected to voltage supply lead 246 which supplies energizing voltage to the respective actuators 222 and 220.

The DC voltage supply lead 246 supplies energizing voltage to the parallel-connected actuator coils 248 and 250 of respective opposite end motor actuators 222, as well as through a reversing switch 252 to the ends of parallel-connected actuator coils 254 and 256 of respective pump actuators 220. Each of the actuators 220 and 222 is a commercially available type of complementary servo positioner of the self-centering type known as Moog actuator model No. 86–130.

It should be understood, too, that in the event that the electrical system of FIG. 9 is employed for control of a single-end drive system, only a single pump actuator 220 and motor actuator 222 and their respective actuating coils will be employed.

Current control or apportionment through the respective motor coils 248 and 250 and pump coils 254 and 256 is controlled by the foot pedal control circuitry 258 of FIG. 8 operating through respective NPN-transistors 260 and 262 (FIG. 9). Actuation of foot pedal circuitry 258 is effected by pedal depression and release of a foot pedal 264 which is hingedly secured about an axis 266 to a suitable floor 268 in the operator's cab 218 (FIG. 6). Foot pedal 264 (FIG. 8) translates vertical motion along a connector rod 270 which is pivotally connected to drive a lever arm 272 of a crank lever 274 secured for pivotal movement within a bracket 276. A lever arm 278 transmits the angularly displaced motion by horizontally reciprocating a connector rod 280 which carries an electrical wiper assembly 282.

The lever arm 278 is connected to a tension spring 284 which is secured to a mounting post 286 and serves to provide spring return of the crank lever 274 and, therefore, the foot pedal 264. A pair of adjusting screws 288 and 290 provide direct adjustment of the crank lever 274 by abutment against respective limit flanges 292 and 294. A bellows-type dust cover 296 is suitably connected between the underside of foot pedal 264 and a support bracket 298 securely and sealingly affixed to mounting 268 in such a manner as to seal off dust, moisture and the like outside and away from connector rod 270 and the mechanical and electrical components operationally mounted with a space 300.

It is also preferable to mount a pair of variable potentiometers 302 and 304 within the protected space 300. The variable resistances 302 and 304 are mounted in mutually exclusive alignment as regards their interaction with respective wiper elements or contacts 306 and 308 as insulatively supported on wiper assembly 282. Thus, as illustrated functionally in FIG. 8, a leftward horizontal stroke of connector rod 280 will drive wiper assembly 282 along the variable resistances 302 and 304 such that wiper 306 taps off a varying resistance along variable resistor 302 until it is finally in contact with the connector wire or no-resistance portion 310 and, simultaneously, wiper 308 proceeds along a no-resistance wire portion 312 to finally progress along the variable resistance element 304.

The variable resistance element 302 receives a supply of voltage from an input lead 314 as derived from a negative voltage supply voltage divider consisting of resistors 316 and 318 (FIG. 9), and the remaining end of variable resistor 302 is connected to ground. The wiper element 306 is connected via lead 320 to the emitter of NPN-transistor 262 which has its base grounded through a resistor 322 and its collector connected via lead 324 to one side of reversing switch 252. The reversing switch 252 serves to reverse the polarity of the applied voltage to the actuator coils 254 and 256, thereby to reverse the direction of actuation of the pump actuators 220 upon reversing the direction of the switch. This is not necessary for the motor actuators 222 due to the nature of the overall motor-pump drive interaction.

Referring again to FIG. 8, the variable resistance 304 is energized by negative voltage input on a lead 326 as derived from a negative voltage divider consisting of series-connected resistors 328 and 330 (FIG. 9). Output voltage indication from variable resistance 304 is taken during the bottom half of the s,roke of the foot pedal 264 by wiper element 308 with conduction of an indication voltage along lead 332 for input to the emitter of transistor 260. The base of transistor 260 is connected through a resistor 334 to ground, and its collector is connected by a lead 336 to the return side of motor actuator coils 248 and 250.

In operation, first depression of foot pedal 264 results in an increase in negative voltage being contacted by the pump wiper element 306 and applied via lead 320 to cause increased conduction in transistor 262 thereby to produce proportionately more current flow through the respective actuator coils 254 and 256 which vary the swashplate in the respective pumps 26 accordingly. As wiper element 306 progresses to the maximum voltage point on variable resistance 302, this proportionate voltage on lead 320 follows to cause increasing conduction through transistor 262 and the pump actuator coils 254 and 256. At the midpoint of travel of the foot pedal 264, the pumps 26 are at full displacement and, at this time, wiper element 308 is brought into contact with the motor variable resistance 304 to effect voltage variation on output lead 332. The transistor 260 is then controlled in the same manner previously described for transistor 262 to cause proportionate voltage variation through motor actuator coils 248 and 250 to vary the contribution of the variable displacement hydraulic motors 38.

It will thus be seen that the dual drive systems provided for the motor grader 200 will be controlled to operate in the same manner as the single drive system previously described, except that in the dual drive system embodiment disclosed, each of the drive systems has a single speed range. Each of the individual drive systems will perform to provide a high torque output to the respective wheels 16 in the working speed range and will provide a higher speed at reduced torque when it is desired to move the motor grader from one working location to another. It will also be clear that the drive systems of the dual arrangement will be operated simultaneously by the various control circuits previously described.

Figure 11:
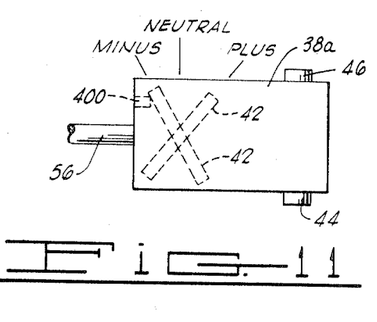
FIG. 11 is a schematic illustration of a modified variable displacement motor.

We have also found that the variable motors may be slightly modified as schematically illustrated in FIG. 11 and an increased speed obtained for traveling from one working location to another, particularly with a dual system of the type just described, but may also be used in a single drive system arrangement if the fixed displacement motor can withstand the increased r.p.m. obtained.

As shown in FIG. 11, the usual stop 400, normally employed to limit the movement of the swashplate 42 to a neutral (or slightly positive) position when the displacement is being reduced, is shortened. With this arrangement the swashplate 42 may be moved to what may be considered a minus or negative position such that the motor may act as a pump. The resultant structure has been designated 38a in FIG. 11.

Assuming each motor 38 in FIG. 7 is replaced by a modified motor 38a, each drive system will operate in the following manner. When the swashplate 42 of the respective pump 26 has been moved to a maximum displacement position, the swashplate of the motor 38a is moved toward a neutral position to obtain an increased speed in the same manner as previously described. However, instead of stopping the swashplate 42 at neutral with the modified arrangement (where no fluid would flow through the motor 38a) the swashplate 42 is moved on to a negative or minus position beyond neutral. With the swashplate 42 in this position, a portion of the fluid being used to drive the associated fixed displacement motor 40 is bypassed from the discharge side of motor 40 through the motor 38a in a reverse direction, since the motor 38a is being driven through the gears 58 and 66 and is acting as a pump to pump fluid in a direction which would be the reverse to the direction of fluid flow if the motor 38a were acting as a motor. For example, if the motor 40 is acting in a forward direction, a portion of the fluid discharging from its port 50 is bypassed into the port 46 of motor 38a, discharged from port 44 of motor 38a, and then redirected into port 48 of motor 40 to increase the speed of operation of motor 40. The increased speed of operation is at a sacrifice of torque, but it has been found that when the system is used on a motor grader drive system, sufficient torque is available for moving the grader from one working location to another.

It may also be noted that the minus position of the swashplate 42 has been exaggerated in FIG. 11 for clarity of illustration. A minus or negative position 4 to 6 degrees from neutral would be the most normally employed.

Figure 12:
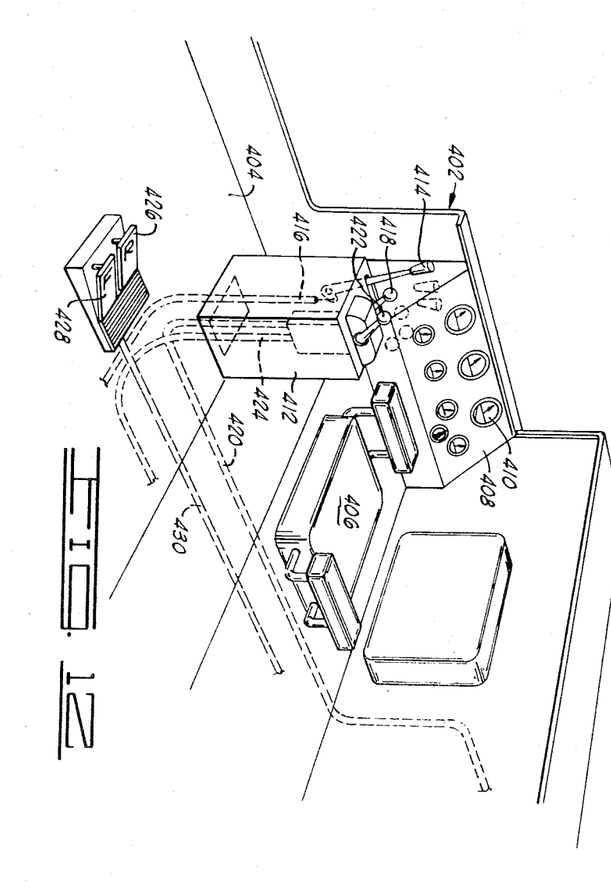
FIG. 12 is a partial schematic illustration of an operator's compartment illustrating the controls available to the operator of a motor grader in one embodiment of the present invention.

EMBODIMENT OF FIG. 12

In the embodiments previously described, the variable displacement pump or pumps and variable displacement motor or motors were all controlled by a single foot pedal which assures that the pumps and motors will be operated in the proper sequence, and that type of system is desirable when the equipment is being operated by an operator not highly skilled. However, it is also desirable in some instances to provide separate controls for the pump or pumps and the variable displacement motor or motors, as well as the clutch and the main engine. This latter type of system is partially illustrated in FIG. 12 as adapted to the motor grader and drive system illustrated in FIGS. 1, 2A, and 2B.

Referring to FIG. 12 in detail, reference character 402 generally designates an operator's compartment having the usual floor plate 404 and operator's seat 406. A console 408 is positioned on the right-hand side of the seat 406 and contains the necessary dials 410 for indicating various conditions of the drive system to the operator of the equipment.

A vertical housing 412 is positioned to the right and slightly in front of the seat 406 to support a series of hand operated levers within the convenient reach of an operator positioned in the seat 406. One lever 414 is suitably connected to a push-pull cable 416 which is in turn connected (not shown) to the control ring 84 of the clutch 70 illustrated in FIG. 2B. The solid line position of the lever 414 (FIG. 12) indicates a typical position of the lever when the clutch 70 is shifted to such a position as to increase the speed of operation of the drive system in the manner previously described. The adjacent dashed line position of the lever 414 indicates the neutral position of the clutch, and the next dashed line position of the lever indicates the position of the lever when the clutch is positioned for the working speed range of the drive system as previously described. It will therefore be apparent that the operator may easily control the clutch 70.

The housing 412 also supports a lever 418 connected to a push-pull cable 420 which is in turn connected to the governor of the main engine 24 (FIG. 2A). The solid line position of the lever 418 (FIG. 12) typifies the position for controlling the speed of the engine 24 while the drive system is being employed either in the working speed range or when the motor grader is being moved at a maximum speed from one working location to another. The adjacent dashed line position of lever 418 typifies the position of the lever when the engine 24 is operated at an intermediate speed, such as when the motor grader is being moved only a short distance from one working location to another and a high speed is not required. The next dashed line position of the lever 418 typifies the position of the lever when the engine 24 is at an idle speed which, of course, is the speed of the engine when first started and when the motor grader is at rest. It should also be pointed out that although the lever 418 is used to control the speed of operation of the engine, when the motor grader is in operation, the speed of the engine will be retained constant for any particular type of activity and the speed of operation of the motor grader will be controlled by the hydrostatic drive system previously described.

The housing 412 further supports a lever 422 connected to a suitable push-pull cable 424 which in turn is connected to the control element 42 of the variable displacement motor 38 shown in FIG. 2A. The lever 422 (FIG. 12) is for the purpose of varying the displacement of the motor 38 between maximum and zero and is used in lieu of the foot pedal arrangement previously described. The solid line position of the lever 422 typifies the position of the lever when the control element 42 of the motor 38 is in a zero displacement position as described previously in connection with FIG. 2A, or in a negative position as previously described in connection with FIG. 11, to provide a high-speed output for the drive system when the motor grader is being moved from one working location to another. The dashed line position of the lever 422 typifies the position of the lever when the control element of the associated hydrostatic motor is at maximum displacement, at which time the drive system has maximum torque output, as previously described. It will be understood that the displacement of the motor 38 is controlled in the same manner as previously described for the most efficient operation of the drive system. That is, the displacement of the motor 38 will be at a maximum while the displacement of the associated pump 26 (FIG. 2A) is being varied from zero displacement to maximum displacement, and then the displacement of the motor 38 is decrease to provide an increased speed of operation of a system at a decreased torque.

This system (FIG. 12) also employs a pair of foot pedals 426 and 428 suitably supported on the floor plate 404 and suitably connected to a push-pull cable 430 leading to the control element 32 of the variable displacement pump 26 shown in FIG. 2A. The foot pedal 426 may be used for moving the control element 32 of the pump in a direction to reverse the movement of the motor grader in the manner previously described, and the foot pedal 428 may be used independently to control the forward movement of the motor grader in the manner previously described. With both of the foot pedals 426 and 428 in their raised positions as shown in FIG 12, the control element 35 of the pump 26 will be in a neutral position. Thus, if the operator desires to move the motor grader in a forward direction, he depresses the foot pedal 428, and if he desires to move the motor grader in a reverse direction he depresses the pedal 426. The pedals 426 and 428 will be provided with suitable spring returns and suitably connected to one end of the push-pull cable 430, while the opposite end of the push-pull cable 430 is suitably connected to the control element 32 of the pump 26.

Figure 13:
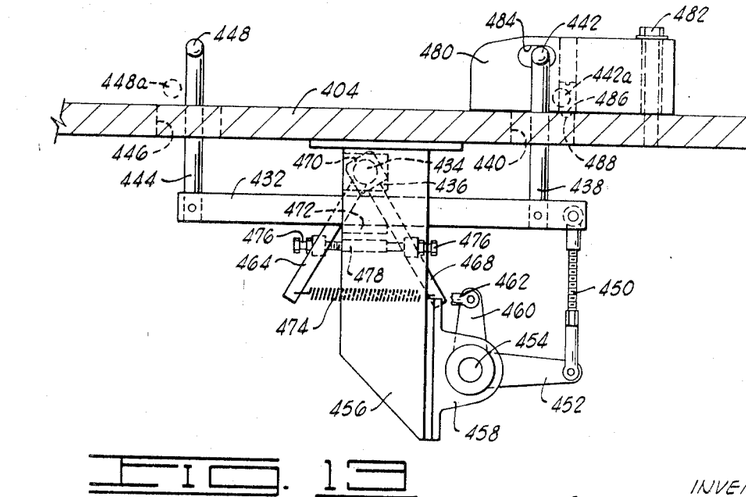
FIG. 13 is a side view of a modified foot pedal arrangement illustrating a single foot pedal for controlling the variable displacement pump of the drive system, and would be employed in the operator's compartment of FIG. 12 in lieu of the dual pedals illustrated in FIG. 12.
Figure 14:
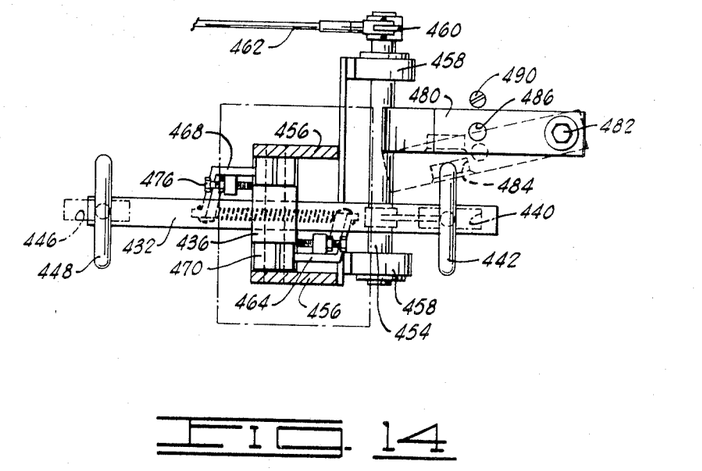
FIG. 14 is a plan view of the structure shown in FIG. 13 with the floor plate removed for clarity of illustration.
Figure 15:
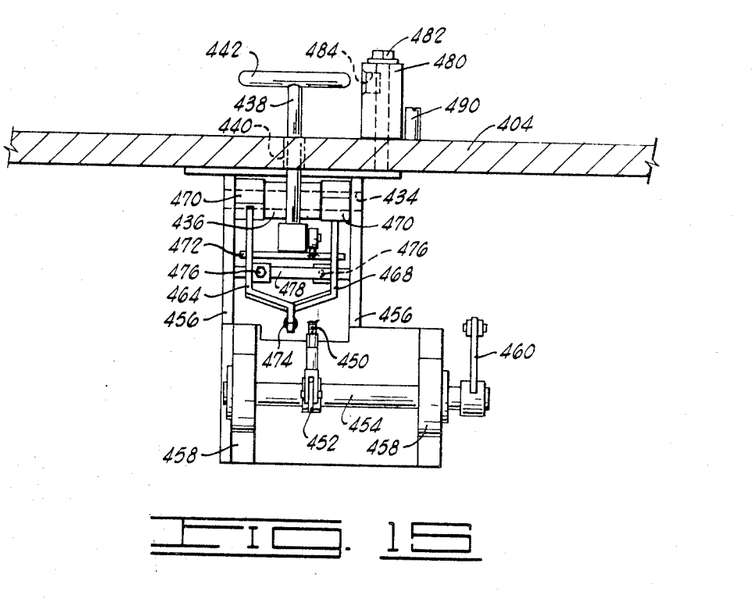
FIG. 15 is an end view of the structure shown in FIG. 13.

EMBODIMENTS OF FIGS. 13–15

The separate foot pedals 426 and 428 for controlling the variable displacement pump as illustrated in FIG. 12 may be replaced by a single foot pedal in the operator's compartment 402 as illustrated in FIGS. 13–15. The single foot pedal shown in these latter drawings comprises a bar 432 positioned below the floor plate 404 of the operator's compartment and pivotally supported in the central portion thereof from a horizontally extending shaft 434 by means of a suitable bearing 436. A vertical rod 438 is secured to one end portion 432 and extends upwardly through an aperture 440 in the floor plate 404. A crossbar or rod 442 is secured to the upper end of the rod 438 to be engaged by the toe portion of the foot of the operator. A similar vertical rod 444 is secured to the opposite end portion of the bar 432 and extends upwardly through an aperture 446 in the floor plate 404. A horizontal bar 448 is secured to the upper end of the rod 444 and is positioned to be engaged by the heel of the operator.

An adjustable link 450 is pivotally secured to the end of the bar 432 adjacent to the rod 438 and extends downwardly into pivotal connection with the outer end of a bellcrank 452. The crank 452 is rigidly secured to a horizontally extending shaft 454 journally supported on stationary plates 456 by bearings 458. Another crank 460 is rigidly secured to the shaft 454 in spaced relation to the crank 452 and has a rod 462 pivotally secured to the outer end thereof. The rod 462 is in turn suitably connected, as by a push-pull cable, to the control element 32 of the variable displacement pump 26 (FIG. 2A). It will thus be seen that when the bar 432 is pivoted by the operator depressing either the crossbar 442 or the crossbar 448, the rod 462 will be moved to the left or to the right from the position shown in FIG. 13, which is the neutral position. The structure described is arranged in such a manner that when the operator depresses the crossbar 442 from the solid line position shown in FIG. 13 to the dashed line position designated 442a, the control element of the pump will be moved from neutral to a maximum displacement position for moving the motor grader forward. When the operator depresses the bar 448 with his heel from the solid line position shown in FIG. 13 to the dashed line position indicated by reference character 448a, the control element of the pump will be moved from neutral to maximum displacement in a direction for a reverse movement of the motor grader.

When the operator is not depressing either the bar 442 or the bar 448, the bar 432 is held in a horizontal, neutral position by a pair of levers 464 and 468. Each of the levers 464 and 468 is journaled on the shaft 434 by a suitable bearing 470 and the levers 464 and 468 extend generally downwardly from the shaft 434 on opposite sides of a block 472 rigidly secured to the underside of the bar 432 directly below the shaft 434. The lower ends of the levers 464 and 468 are interconnected by a tension spring 474 which urges the levers into engagement with the opposite sides of the stop 472. Each of the levers 464 and 468 is also provided with an adjusting screw 476 threadedly secured thereto in a position to engage another stop 478 rigidly secured to the plates 456. The screws 476 are adjusted to position the levers 464 and 468 equal distances from the opposite sides of the stop 478 when the bar 432 is released by the operator to engage the opposite sides of the stop 472 and retain the bar 432 in a horizontal, neutral position.

A combination foot rest and locking block 480 is pivotally secured on the floor plate 404 by a bolt 482. A recess 484 is formed in one side of the block 480 to receive the respective end of the bar 442 when the block 480 is pivoted to the dashed line position illustrated in FIG. 14 to lock the bar 432 in its neutral position. A spring-loaded detent 486 is carried in the lower surface of the block 480 and cooperates with mating recesses 488 in the floor plate 404 to alternately hold the block 480 in the full line position and in the dashed line position illustrated in FIG. 14. Also, a stop 490 is secured to the floor plate 404 in a position to limit the movement of the block 480 away from the bar 442 to the full line position illustrated in FIG. 14. In such full line position, the block 480 functions as a foot rest for the operator.

From the foregoing it will be apparent that the present invention attains the objects heretofore set forth.

Changes may be made in the combination and arrangement of parts or elements as heretofore set forth in this specification and shown in the drawing without departing from the spirit and scope of the invention as defined in the following claims.

What is claimed is:

1. A drive system for a vehicle, comprising:
   an engine;
   a variable displacement pump having a displacement control element and forward and reverse ports;
   means drivingly connecting the engine to the pump;
   a variable displacement motor having an output shaft, a displacement control element and forward and reverse ports;
   a fixed displacement motor having an output shaft and forward and reverse ports;
   conduit means connecting the forward port of the pump to the forward ports of the variable displacement motor and the fixed displacement motor in parallel for turning the output shafts of the motors in one direction when fluid is discharged from the forward port of the pump;
   conduit means connecting the reverse port of the pump to the reverse ports of the variable displacement motor and the fixed displacement motor in parallel for turning the output shafts of the motors in an opposite direction when fluid is discharged from the reverse port of the pump;
   drive wheel means on the vehicle;
   means drivingly connecting the output shafts of the motors in parallel to the drive wheel means; and
   control means connected to the control elements of the pump and the variable displacement motor for individually controlling said control elements, whereby the pump may be varied from zero to maximum displacement while the variable displacement motor remains at maximum displacement for essentially uniform torque output to the drive wheels, and then the variable displacement motor may be varied from maximum to zero displacement while the pump is at maximum displacement for increased speed of operation of the drive wheel means.

2. A system as defined in claim 1 wherein said control means comprises:
   a single foot pedal; and
   linkage means connecting the foot pedal to each of said control elements arranged to first vary the pump displacement from zero to maximum and then vary the variable displacement motor displacement from maximum to substantially zero upon movement of the foot pedal in one direction.

3. A system as defined in claim 2 wherein said linkage means comprises:
   a first link connected to the control element of the pump having a cam follower thereon, which, upon actuation from a neutral position in a first direction changes the displacement of the pump from zero to maximum, and upon actuation in an opposite direction from neutral changes the displacement of the pump in a reverse direction;
   a second link connected to the control element of the variable displacement motor having a cam follower thereon, which, upon actuation in a first direction from neutral changes the displacement of the variable displacement motor from maximum to zero, and upon actuation in an opposite direction from neutral, changes the displacement of the variable displacement motor from maximum to zero, and
   rotatable cam means connected to the foot pedal for turning in one direction upon movement of the foot pedal in said one direction and for turning movement in an opposite direction upon movement of the foot pedal in an opposite direction, said cam means having a first cam surface thereon engaging the follower on the first link and a second cam surface thereon engaging the follower on the second link.

4. A system as defined in claim 3 wherein said cam means comprises two cam plates secured to a common shaft for simultaneous movement, one of said plates being associated with the pump and the other of said plates being associated with the variable displacement motor.

5. A system as defined in claim 3 wherein said cam surfaces are shaped to move said followers in opposite directions from a neutral position.

6. A system as defined in claim 5 wherein said cam surfaces are further shaped to vary the displacement of the pump prior to varying the displacement of the motor when the cams are moved in either direction from neutral, whereby the torque output of the motors will be essentially uniform throughout the range of displacement of the pump until the displacement of the variable displacement motor is reduced.

7. A system as defined in claim 4 wherein said cam surfaces are formed by slots in the cam plates having varying radii from the centerline of the common shaft.

8. A system as defined in claim 1 wherein the means for drivingly connecting the output shafts of the motors to the drive wheel means comprises:
   a first ring gear connected to the wheel means;

a second ring gear mounted on the output shaft of the variable displacement motor and meshing with the first ring gear; and a third ring gear mounted on the output shaft of the fixed displacement motor meshing with the first gear.

9. A system as defined in claim 8 wherein the first gear has a larger diameter than the second and third gears.

10. A system as defined in claim 9 wherein the motors have equal displacements and the second and third gears are of equal diameter.

11. A system as defined in claim 10 characterized further to include:

a fourth ring gear having a diameter less than the diameter of the first gear;

clutch means for connecting the first gear, and, alternately, the fourth gear to the drive wheel means;

a fifth ring gear mounted on the output shaft of the variable displacement motor meshing with the fourth ring gear; and a sixth ring gear mounted on the output shaft of the fixed displacement motor meshing with the fourth ring gear and having a diameter equal to the diameter of the fifth ring gear and greater than the diameters of the second and third gears, whereby the operating speed range of the vehicle may be increased by connecting the fourth gear to the drive wheel means.

12. A system as defined in claim 1 wherein the control elements of the pump and the variable displacement motor are swashplates.

13. A system as defined in claim 1 wherein the pump, variable displacement motor and constant displacement motor are of equal displacements.

14. A system as defined in claim 2 wherein the linkage means comprises:

a first electrical circuit connected to the control element of the pump and including a first variable resistor;

a second electrical circuit connected to the control element of the variable displacement motor and including a second variable resistor;

a first wiper connected to a power supply and carried by the foot pedal to slidingly engage the first variable resistor; and a second wiper connected to a power supply and carried by the foot pedal in a position to slidingly engage the second variable resistor after the first wiper has traversed the first variable resistor as the foot pedal is continued to be moved in said one direction.

15. A system as defined in claim 14 characterized further to include a reversing switch in the first electrical circuit for selectively operating the pump in a forward or reverse direction.

16. A drive system for a vehicle having two sets of drive wheels, comprising:

a pair of engines having equal operating speeds;

a variable displacement pump for each engine having a displacement control element and forward and reverse ports;

means drivingly connecting each pump to the respective engine;

a variable displacement motor for each pump having an output shaft, a displacement control element and forward and reverse ports;

a constant displacement motor for each pump having an output shaft and forward and reverse ports;

conduit means connecting the forward port of each pump to the forward ports of the associated variable displacement motor and fixed displacement motor in parallel for turning the output shafts of the respective motors in one direction when fluid is discharged from the forward port of the respective pump;

conduit means connecting the reverse port of each pump to the reverse ports of the associated variable displacement motor and fixed displacement motor in parallel for turning the output shafts of the respective motors in an opposite direction when fluid is discharged from the reverse port of the respective pump;

means drivingly connecting the output shafts of one pair of associated motors in parallel to one set of the drive wheels;

means drivingly connecting the output shafts of the other pair of associated motors in parallel to the other set of drive wheels;

control means connected to the control elements of both pumps and both variable displacement motors arranged to move the control elements of the pumps simultaneously in the same direction and move the control elements of variable displacement motors simultaneously in the same direction, but separately from operation of the control elements of the pumps, whereby the pumps may be varied from zero to maximum displacement while the variable displacement motors remain at maximum displacement for essentially uniform torque output to the drive wheels, and then the variable displacement motors may be varied from maximum to zero displacement for increased speed of operation of the drive wheels.

17. A system as defined in claim 16 wherein the control means comprises:

a single foot pedal;

a first electrical circuit connected to the control elements of both pumps and including a first variable resistor;

a second electrical circuit connected to the control elements of both variable displacement motors and including a second variable resistor;

a first wiper connected to a power supply and carried by the foot pedal in a position to slidingly engage the first variable resistor; and a second wiper connected to a power supply and carried by the foot pedal in a position to slidingly engage the second variable resistor after the first wiper has traversed the first variable resistor as the foot pedal is moved in one direction.

18. A system as defined in claim 1 wherein the variable displacement motor is capable of acting as a pump and the control element of the variable displacement motor is adapted to move from a maximum displacement position through a zero displacement position to a negative displacement position, whereby the variable displacement motor may act as a pump and recirculate fluid through the fixed displacement motor for an increased speed of operation of the fixed displacement motor.

19. A drive system as defined in claim 1 wherein the control means comprises:

a hand lever connected to the control element of the variable displacement motor; and a pair of foot pedals connected to the control element of the pump, one of which moves the control element in a direction from a zero displacement position for forward movement of the vehicle and the other moves such control element from a zero displacement position in a direction for reverse movement of the vehicle.

20. A drive system as defined in claim 1 wherein the control means comprises:

a hand lever connected to the control element of the variable displacement motor; and a foot pedal connected to the control element of the pump for moving said control element in either direction from a zero displacement position.

21. A drive system as defined in claim 20 wherein the foot pedal includes:

a bar pivotally secured to the vehicle at the medial portion of the bar;

a stop secured to the medial portion of the bar;

a lever on each side of the stop having one end pivotally secured to the vehicle; and a spring interconnecting the opposite ends of the levers for urging the levers against the opposite sides of the stop for holding the bar in a predetermined position corresponding to the zero displacement position of the pump control element when the foot pedal is released.

* * * * *